Feb. 28, 1933. G. G. FLOYD Re. 18,754

SIDE FRAME

Original Filed Aug. 6, 1928 3 Sheets-Sheet 1

Inventor:
George G. Floyd,
By Dickinson, Huxley, Byron & Knight Attys.

Feb. 28, 1933. G. G. FLOYD Re. 18,754

SIDE FRAME

Original Filed Aug. 6, 1928 3 Sheets-Sheet 2

Inventor
George G. Floyd,
By Wilkinson, Huxley, Byron & Knight
Attys.

Inventor:
George G. Floyd,
By Atkinson, Huxley, Byron & Knight Attys.

Reissued Feb. 28, 1933

Re. 18,754

UNITED STATES PATENT OFFICE

GEORGE G. FLOYD, OF CHICAGO, ILLINOIS, ASSIGNOR TO AMERICAN STEEL FOUNDRIES, OF CHICAGO, ILLINOIS, A CORPORATION OF NEW JERSEY

SIDE FRAME

Original No. 1,745,847, dated February 4, 1930, Serial No. 297,820, filed August 6, 1928. Application for reissue filed October 24, 1931. Serial No. 570,990.

This invention relates to side frames for railway car trucks and in particular to cast side frames incorporating integrally formed journal boxes.

In the usual form of truck side frames, wheel and axle assemblies are disposed to carry side frames, which frames as a complete structure support a bolster through the medium of suitable coil or other springs. The members of the side frames are disposed to give substantially a so-called "truss" design, and to this end there are provided an upper compression member and a lower tension member disposed between journal boxes, the said members being spaced apart adjacent the center of the frames and connected by spaced vertical columns. A portion of the tension member is used as a beam extending between the columns, and forms a convenient spring seat for the spring supporting bolsters for transmitting the load from the bolsters to the truss structure. This spring supporting portion of the tension member is therefore subjected to bending action which, by the rigid connection of said portion with the rest of the truss structure, particularly at the columns, induces bending in the other members and thus tends to derange or deranges the true truss action and causes bending stresses to be added to the direct stresses. Further, the points of support of the side frame on the axles through the journal boxes are not at the true junctions of the tension and compression members but are in reality on extending cantilever portions which are so adapted as to provide a practical seat for the journal boxes and may have the journal boxes cast integrally therewith and depending therefrom. This results in a further lack of equilibrium, this time adjacent the journal boxes, because here again there is not a true truss action. The strength therefore of this construction must be largely dependent upon the stiffness and rigidity of the members adjacent the journal boxes.

In building frames of this type for certain classes of railway service, the requirements of definite rigidity and minimum of deflection under maximum imposed loads, in the face of a definite weight limitation of casting, create difficult problems for the designer. Metal must be distributed where it is most efficacious and care must be exerted to insure internal fiber stresses remaining within reasonable bounds.

An object of the present invention is to produce a side frame of the above mentioned type combining maximum rigidity and stiffness, within a definite weight and fiber stress limitation, through a proper positioning of members and a correct distribution of metal.

Another object is to produce a side frame of a design to successfully fulfill all requirements of manufacture, test and service, and one which performs these and other functions without additional weight in the frame.

Yet another object is to provide a side frame which is of substantially true truss structure and functions as such.

Still another object is to provide a side frame construction wherein a plurality of truss structures are utilized.

A further object of the invention is to provide a side frame which is of a construction whereby the members are so arranged that the fiber stresses are in substantial equilibrium.

A still further object is to provide a side frame of such construction as will fulfill all requirements of manufacture and service.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1:
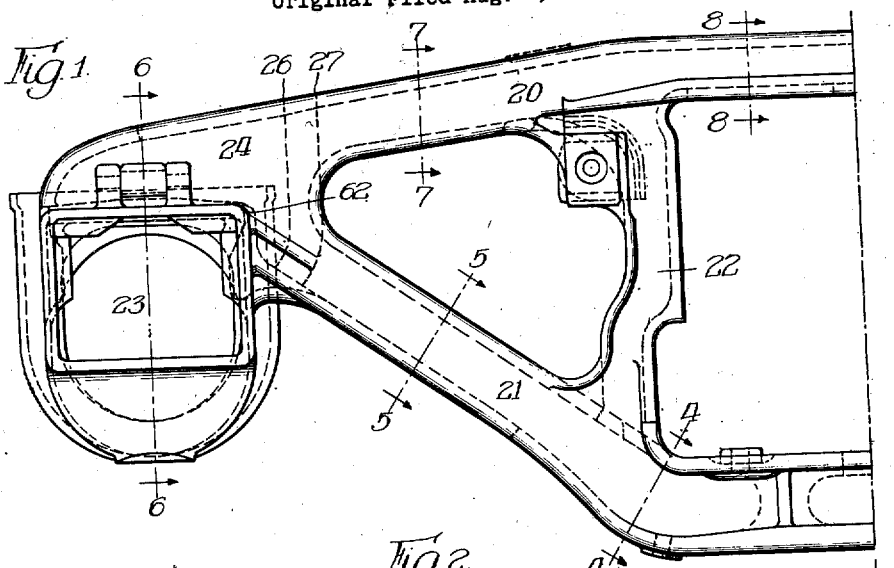
Figure 1 is a longitudinal side elevation of substantially one half of a side frame which is the subject matter of this invention.
Figure 2:
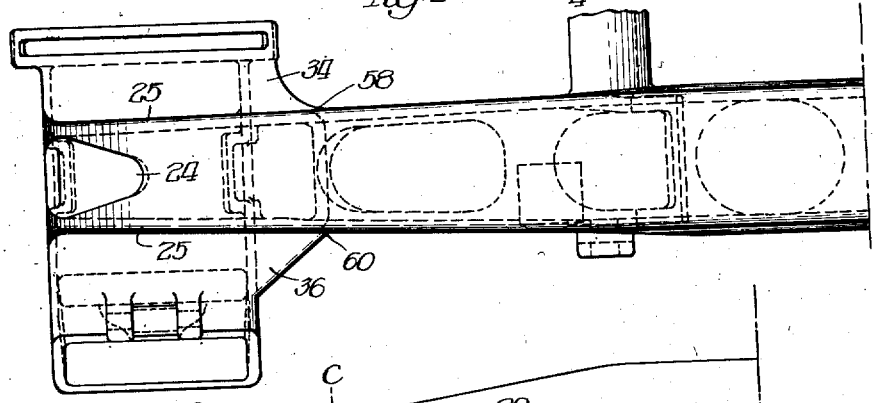
Figure 2 is a top plan view of the side frame illustrated in Figure 1.

Referring now more particularly to Figures 1 and 2, it will be seen that the integrally cast side frame consists substantially of an upper compression member 20; a lower tension member 21, the vertical struts or pedestals 22—22, journal boxes 23—23 and the portions 24—24 overlying and adjacent to said journal boxes formed by the merging of the compression and tension members 20 and 21, respectively.

Figure 4:
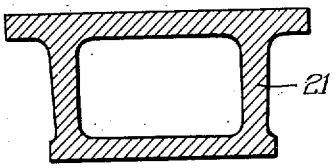
Figure 4 is an enlarged sectional elevation through the tension member of the frame, the same being taken substantially in the plane as indicated by the line 4—4 of Figure 1.
Figure 5:
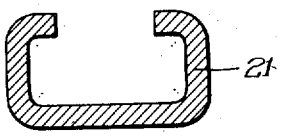
Figure 5 is an enlarged sectional elevation through the tension member of the frame, the same being taken substantially in the plane as indicated by the line 5—5 of Figure 1.
Figure 6:
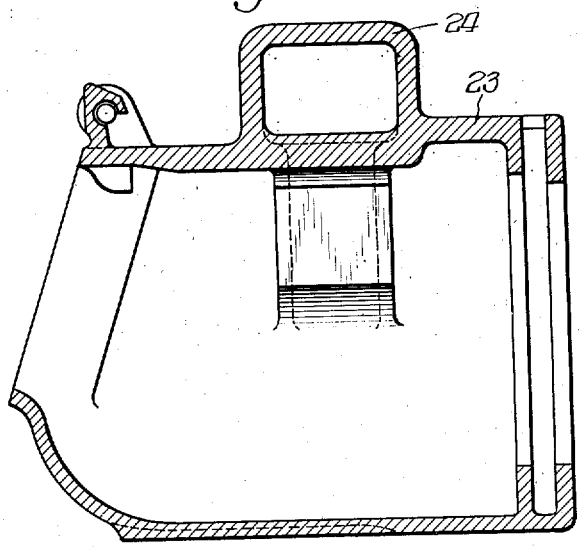
Figure 6 is an enlarged sectional elevation through the journal box and frame member, the same being taken substantially in the plane as indicated by the line 6—6 of Figure 1.
Figure 7:
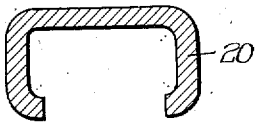
Figure 7 is an enlarged sectional elevation through the compression member of the frame, the same being taken substantially in the plane as indicated by the line 7—7 of Figure 1.
Figure 8:
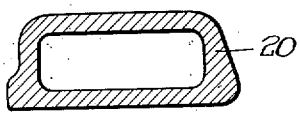
Figure 8 is an enlarged sectional elevation through the compression member of the frame, the same being taken substantially in the plane as indicated by the line 8—8 of Figure 1.

The compression member 20 is of multiple section, varying from a substantially rectangular section in the merged portion above the journal boxes, as illustrated in Figure 6, to an open channel section illustrated in Figure 7 and to a rectangular closed section on the frame center as illustrated in Figure 8. The tension member 21 is of similar variation in sectional form, as represented in Figures 4 and 5, in which Figure 4 is of reenforced closed rectangular construction and Figure 5 is of open channel section. It thus may be said that the tension and compression members are of substantially box section, the portions thereof between the columns and the journal boxes being of U-section having a web or chord and flanges. The flanges are reflanged inwardly, thereby forming facing chords spaced by side chords which serve to connect the facing chords to the web.

While the general type of side frames shown is not uncommon in the art, with the constant increase in car loadings difficulty has been experienced in securing the requisite rigidity without exceeding the imposed limitations of casting weight. To obviate this it was necessary to determine the sections of maximum stress, and after a series of experiments and with the use of strain gauges under varied loads, and after mathematical and graphic analyses, it was found that the maximum deflection occurred in the regions adjacent the journal boxes and in proximity to the point of mergence of the compression member 20 and the tension member 21.

In the present perfected invention the requisite stiffness and rigidity have been secured without materially adding to the total weight by internally increasing the thickness of the side walls 25—25 of region 24 to the left of the dotted boundary indicating line 26, over the thickness of the side walls of the members 20 and 21 and extending to the right of corresponding line 27, all as viewed in Figure 1. Between said limiting lines 26 and 27 there is a gradual transition of wall section. A similar effect may be had by increasing the thickness of the walls radially from a point defined by the junction of the line AB and the extreme inner corner of the journal box, i. e., at point 62, the large radius of the thickened section being the distance from the point 62 to the line 27 measured along the line AB, i. e., from 62 to 64.

Figure 3:
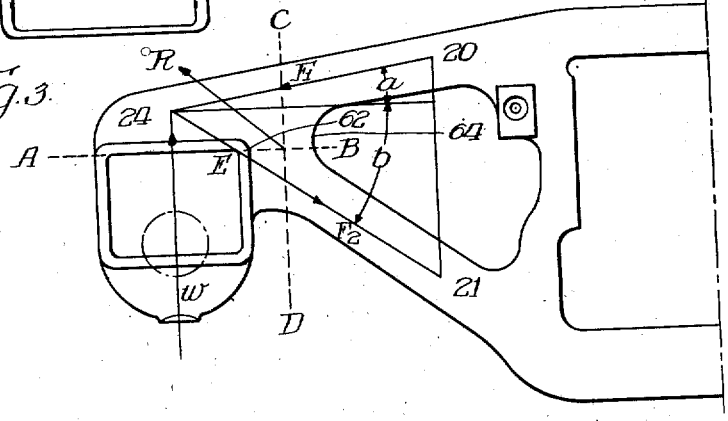
Figure 3 is a graphic representation of concurrent forces acting in the frame under service conditions.

An understanding of the forces involved may be had by reference to Figure 3. This figure diagrammatically represents the above side frame carrying a vertical load, the resultants thereof each being substantially one half of the total load and one of which is indicated by the force "W" acting through the journal box center. Considered as a truss, we have a force of compression $F_1$ in the top member and a tensile force $F_2$ in the lower member. The horizontal components of these forces must balance each other to satisfy the necessary condition of equilibrium, therefore: $F_1 \cos a = F_2 \cos b$.

The section AB is therefore subject to a shearing force $F_1 \cos a$ and it should be observed that this section passes through approximately the center of the section indicated by the line CD. Section CD is at the same time subject to a vertical shear equal to the journal box load "W" and this shear is carried almost entirely by the side walls, so it may be said that each side wall carries a total shear of ½W. It is well known that when a rectangular section is subject to a shearing force, the maximum shearing stress occurs at the center of the section, and equals one and one-half times the average shearing stress.

Thus, the metal in the region under consideration is subjected to the combined horizontal shear and a maximum vertical shear. The combined shearing stress is therefore abnormally high and the result is a high tensile stress as represented by force "R" which acts in a direction of approximately 45 degrees to the horizontal and bisects the angle between the section lines AB and CD, and since the point E, at the journal box and junction of the line of force of $F_2$ and section AB, is at a reentrant angle it will carry a high stress due to concentration. To take care of this high resultant force without excessive fiber stresses the walls of the region 24 were thickened as beforementioned, it not being so essential that the tension and compression members be thickened as the shearing stresses in them are relatively unimportant. In order to further reenforce the region adjacent the inner corner of the journal box, diagonal ribs 34 and 36 are provided, said ribs extending along the tension member, i. e., closely adjacent and in the same direction as the resultant of the stresses, and merging into the tension member at points 58 and 60 adjacent the section thickness defining line 27.

Figure 9:
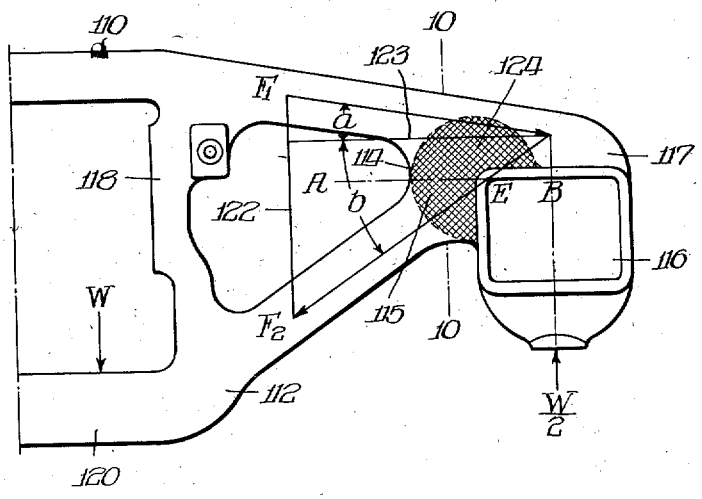
Figure 9 is a fragmentary side elevation of a truck side frame embodying the invention, the figure having the stress diagram superimposed thereupon.
Figure 10:
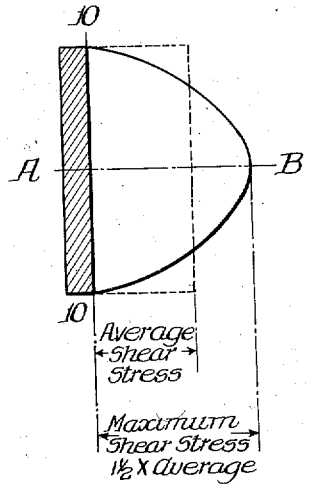
Figure 10 is a diagrammatic representation of the application of a shear diagram to a rectangular section, the same being taken as at section 10—10 of Figure 9.

Referring now more particularly to Figures 9 and 10, the truck side frame illustrated includes an upper compression member 110 and a lower compression member 112 integrally joined at their ends 114, and integrally formed with journal boxes 116. There is a portion 115 forming a portion of the merged ends of the tension and compression members, a portion 117 of this merged portion being disposed above the journal box. The side frame is provided with vertical columns 118 disposed between and integral with the tension and compression members, and a portion 120 of the tension member 112 is formed to provide spring seats for suitable springs supporting the bolster (not shown).

In a side frame such as shown the vertical load W is transmitted through the bolster and spring members to the spring seat portion 120, and considering the side frame as a truss, there is a reaction through each journal box of ½W, and stresses are of course set up in the tension and compression members. There is a force of $F_1$, as indicated by the arrow, set up in the compression member, and a tension force of $F_2$ set up in the tension member, and, as is well known, the horizontal components of these forces must balance each other to satisfy the necessary conditions of equilibrium, that is, $F_1 \cos a$ equals $F_2 \cos b$, angle $a$ being the angle between the compressive force $F_1$ and its horizontal component, and the angle $b$ being the angle between the compressive force $F_2$ and its horizontal component, the stress diagram being completed by the vertical line 122 disposed normal to the reaction line 123. The section AB, then, is subjected to a shearing force equal to $F_1 \cos a$, and it has been found that this section passes approximately through the center of the section 10—10. Section 10—10, therefore, is subjected to a vertical shear equal to the load W, and this shear is carried almost entirely by the side walls of the section, so that the side walls, being in pairs, carry a total shear of ½W.

It is well known that where a rectangular section is subjected to shear, the maximum shearing stress occurs at its center, and is equal to one and one-half times average shear, the diagram being as illustrated in Figure 10. From the above it will be seen that the metal in the section AB is subjected to combined horizontal and maximum vertical shearing stresses. The combined shearing stress at the section is, therefore, abnormally high, which shows that a high tensile stress exists at an angle of approximately 45° to the section AB. Since the point E at the corner of the journal box is a reentrant corner, it will be subjected to a high stress due to concentration at this point. The portion of the side wall, therefore, bound by the radial lines and indicated at 24 is subjected to abnormally high tensile stresses, and this condition is partially relieved by increasing the wall thickness over this area, the increase being in each of the side walls, preferably constant over the shaded area, and gradually merging into the tension and compression members outside this area. The side walls of the tension and compression members do not require increased thickness since the shear stresses in them are relatively unimportant, so therefore they are not thickened, thus saving weight in the frame. The thickness may be carried out by a large increase in section adjacent the corner at E and a gradual diminution and merging of the section, an increase over the normal, however, being maintained over the shaded area.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. A cast side frame for railway car trucks having an upper compression member and a lower tension member, said members being of varied section and merging at journal boxes integral therewith, a portion of the walls of said members overlying and adjacent to said journal boxes being thicker than the walls of said compression and said tension members.

2. In an integrally cast frame for railway car trucks, the combination of an upper compression member, lower tension member, journal boxes connected thereto, and a section overlying said journal boxes formed by the merging of the aforesaid compression and tension members at their outer ends, the side walls of said overlying section adjacent to said journal boxes being of greater thickness than the side walls of said compression and tension members prior to the points of mergence.

3. In an integrally cast side frame for railway car trucks, the combination of journal boxes, a compression member of substantially rectangular and channel cross section, having end portions of substantially rectangular cross section extending over said boxes, and a tension member of substantially rectangular and channel cross section merging with said journal boxes and said compression member, the side walls of the combined tension and compression members and of the resultant end portions thereof being of thicker wall section than that of the side walls of said compression and tension members prior to their mergence into a composite structure.

4. A side frame for railway trucks comprising in a single casting multiple section side members, journal boxes and portions overlying and adjacent to said journal boxes, the side walls of said overlying portions being of thicker section than the side walls of said side members.

5. In a structure of the character described, the combination of component side members having a region formed by the junction of said component members, the side walls of said region being of thicker section than the side walls of either of said members.

6. In a structure of the character described, the combination of multiple cross section compression and tension members having pedestals forming a substantially square center portion and two triangular end portions, journal boxes formed integrally with said tension and compression members at the outward apex of said triangular sections, said members having a region overlying and adjacent to said journal boxes, the side walls of said region being increased in thickness internally over the side wall section of said tension and said compression members.

7. In a side frame, the combination of upper and lower chord members, journal boxes connected thereto, said chords having sections of the walls thereof of varying thicknesses adjacent said journal boxes.

8. In a side frame, the combination of upper and lower chord members, journal boxes connected thereto, said chords having sections of the walls thereof of increased thicknesses adjacent said journal boxes.

9. In a truck side frame, the combination of an upper compression member, a lower tension member, a journal box integrally formed therewith and a section overlying said journal box formed by the merging of said members adjacent the ends thereof, said section having side walls, said side walls being of increased thickness adjacent the journal box.

10. In a truck side frame, the combination of an upper compression member, a lower tension member, a journal box integrally formed therewith and a section overlying said journal box formed by the merging of said members adjacent the ends thereof, said section having side walls, said side walls being of increased thickness adjacent the journal box, and a brace member extending from said journal box along one of said members and merging therewith.

11. In a truck side frame, the combination of an upper compression member, a lower tension member, a journal box integrally formed therewith and a section overlying said journal box formed by the merging of said members adjacent the ends thereof, said section having side walls, said side walls being of increased thickness adjacent the journal box, and a brace member extending along said tension member and merging therewith.

12. In a truck side frame, the combination of an upper compression member, a lower tension member, a journal box integrally formed therewith and a section overlying said journal box formed by the merging of said members adjacent the ends thereof, said section having side walls, said side walls being of increased thickness adjacent the journal box, and a diagonal brace member extending from a corner of said journal box and along said tension member and merging therewith.

13. In a truck side frame, the combination of an upper compression member, a lower tension member, a journal box integrally formed therewith and a section overlying said journal box formed by the merging of said members adjacent the ends thereof. said section having side walls, said side walls being of increased thickness adjacent the journal box, and a diagonal brace member extending from the inner corner of said journal box and along said tension member and merging therewith.

14. In a truck side frame, the combination of an upper compression member, a lower tension member, a journal box integrally formed therewith and a section overlying said journal box formed by the merging of said members adjacent the ends thereof, said section having side walls, said side walls being of increased thickness adjacent the journal box, and a diagonal brace member extending from a corner of said journal box and along said tension member and merging therewith, said brace member being spaced from the upper and lower portions of said tension member.

15. In a truck side frame, the combination of an upper compression member, a lower tension member, a journal box integrally formed therewith, and a section overlying said journal box formed by the merging of said members adjacent the ends thereof, said section having side walls, said side walls being of increased thickness adjacent the journal box, and a diagonal brace member extending from the inner corner of said journal box and along said tension member and merging therewith, said brace member being disposed intermediate the top and bottom portions of said tension member.

16. In a truck side frame, the combination of an upper compression member, a lower tension member having a web portion, a journal box integrally formed with said members and disposed so that the said web portion merges into said journal box below the corner thereof, a section of the junction of said tension and compression members being of substantially box section having side walls of increased thickness from the thickness of the walls of the tension and compression members.

17. In a truck side frame, the combination of an upper compression member, a lower tension member having a web portion, a journal box integrally formed with said members and disposed so that the said web portion merges into said journal box below the corner thereof, a section of the junction of said tension and compression members being of substantially box section having side walls of increased thickness from the thickness of the walls of the tension and compression members, and a brace member extending from said journal box and merging into said side walls.

18. In a truck side frame, the combination of an upper compression member, a lower tension member having a web portion, a journal box integrally formed with said members and disposed so that the said web portion merges into said journal box below the corner thereof, a section of the junction of said tension and compression members being of substantially box section having side walls of increased thickness from the thickness of the walls of the tension and compression members, and a brace member extending from said journal box and merging into said side walls, said brace member extending substantially in the direction of said tension member.

19. In a truck side frame, the combination of an upper compression member, a lower tension member having a web portion, a journal box integrally formed with said members and disposed so that the said web portion merges into said journal box below the corner thereof, a section of the junction of said tension and compression members being of substantially box section having side walls of increased thickness from the thickness of the walls of the tension and compression members, and a brace member extending from said journal box and merging into said side walls, said brace member extending in the direction of said tension member and being intermediate the top and bottom of said member.

20. In a truck side frame, the combination of an upper compression member, a lower tension member, a journal box integrally formed therewith and a section overlying said journal box formed by the merging of said members adjacent the ends thereof, said section having side walls, said side walls being of increased thickness radially from the inner extreme corner of said journal box.

21. In a truck side frame, the combination of an upper compression member, a lower tension member, a journal box integrally formed therewith and a section overlying said journal box formed by the merging of said members adjacent the ends thereof, said section having side walls, said side walls being of increased thickness radially from the inner extreme corner of said journal box, and a brace member extending from said corner of said journal box and merging into the walls of said section.

22. In a truck side frame, the combination of an upper compression member, a lower tension member, a journal box integrally formed therewith and a section overlying said journal box formed by the merging of said members adjacent the ends thereof, said section having side walls, said side walls being of increased thickness radially from the inner extreme corner of said journal box, and a brace member extending diagonally from said corner of said journal box in the direction of said tension member.

23. In a truck side frame, the combination of an upper compression member, a lower tension member, a journal box integrally formed therewith and a section overlying said journal box formed by the merging of said members adjacent the ends thereof, said section having side walls, said side walls being of increased thickness radially from the inner extreme corner of said journal box, and a brace member extending diagonally from said corner of said journal box in the direction of said tension member, and spaced from the upper and lower portions of said tension member.

24. In a truck side frame, the combination of an upper compression member, a lower tension member, a journal box integrally formed therewith, said tension and compression members having a radially thickened portion formed adjacent one corner of said journal box.

25. In a truck side frame, the combination of an upper compression member, a lower tension member, a journal box integrally formed therewith, said tension and compression members having a radially thickened portion formed adjacent the inner corner of said journal box.

26. In a truck side frame, the combination of an upper compression member, a lower tension member, said members being integrally formed adjacent the ends thereof, a journal box integrally fromed adjacent the merged portion of said members, said merged portion of said members being radially thickened adjacent one corner of said journal box.

27. In a truck side frame, the combination of an upper compression member, a lower tension member, said members being integrally fromed adjacent the ends thereof, a journal box integrally formed adjacent the merged portion of said members, said merged portion of said members being radially thickened adjacent the inner corner of said journal box.

28. In a truck side frame, the combination of an upper compression member, a lower tension member, said members being integrally formed adjacent the ends thereof, a journal box integrally formed adjacent the merged portion of said members, said merged portion of said members being radially thickened adjacent one corner of said journal box, the thickened portion of said merged portion gradually tapering to the normal thickness of said tension member.

29. In a truck side frame, the combination of an upper compression member, a lower tension member, said members being integrally formed adjacent the ends thereof, a journal box integrally formed adjacent the merged portion of said members, said merged portion of said members being radially thickened adajacent one corner of said journal box, the thickened portion of said merged portion gradually tapering to the normal thickness of said compression member.

30. In a truck side frame, the combination of an upper compression member, a lower tension member, said members being integrally formed adjacent the ends thereof, a journal box integrally formed adjacent the merged portion of said members, said merged portion of said members being radially thickened adjacent the inner corner of said journal box, the thickened portion of said merged portion gradually tapering to the normal thickness of said tension member.

31. In a truck side frame, the combination of an upper compression member, a lower tension member, said members being integrally formed adjacent the ends thereof, a journal box integrally formed adjacent the merged portion of said members, said merged portion of said members being radially thickened adjacent the inner corner of said journal box, the thickened portion of said merged portion gradually tapering to the normal thickness of said compression member.

32. In a truck side frame, the combination of an upper compression member, a lower tension member, said members being integrally formed adjacent the ends thereof, a journal box integrally formed adjacent the merged portion of said members, said merged portion of said members being radially thickened adjacent one corner of said journal box, the thickened portion of said merged portion gradually tapering to the normal thickness of one of said members.

33. In a truck side frame, the combination of an upper compression member, a lower tension member, said members being integrally formed adjacent the ends thereof, a journal box integrally formed adjacent the merged portion of said members, said merged portion of said members being radially thickened adjacent the inner corner of said journal box, the thickened portion of said merged portion gradually tapering to the normal thickness of one of said members.

34. In a truck side frame, the combination of an upper compression member, a lower tension member, said members being integrally formed adjacent the ends thereof, a journal box integrally formed adjacent the merged portion of said members, said merged portion of said members being radially thickened adjacent one corner of said journal box, the thickened portion of said merged portion gradually tapering to the normal thickness of both of said members.

35. In a truck side frame, the combination of an upper compression member, a lower tension member, said members being integrally formed adjacent the ends thereof, a journal box integrally formed adjacent the merged portion of said members, said merged portion of said members being radially thickened adjacent the inner corner of said journal box, the thickened portion of said merged portion gradually tapering to the normal thickness of both of said members.

36. In a truck side frame, the combination of an upper compression member, a lower tension member, said members being integrally formed adjacent the ends thereof, a journal box integrally formed adjacent the merged portion of said members, said merged portion of said members extending over said journal box and being radially thickened adjacent one corner of said journal box.

37. In a truck side frame, the combination of an upper compression member, a lower tension member, said members being integrally formed adjacent the ends thereof, a journal box integrally formed adjacent the merged portion of said members, said merged portion of said members extending over said journal box, said merged portion being radially thickened adjacent one corner of said journal box.

38. In a truck side frame, the combination of an upper compression member, a lower tension member, said members being integrally formed adjacent the ends thereof, a journal box integrally formed adjacent the merged portion of said members, said merged portion of said members extending over said journal box, said merged portion including the portion over said journal box being radially thickened adjacent the inner corner of said journal box.

39. In a truck side frame, the combination of an upper compression member, a lower tension member, said members being integrally formed adjacent the ends thereof, a journal box integrally formed adjacent the merged portion of said members, said merged portion of said members extending over said journal box, said merged portion including the portion over said journal box being radially thickened adjacent one corner of said journal box, the thickened portion of said merged portion gradually tapering to the normal thickness of said tension member.

40. In a truck side frame, the combination of an upper compression member, a lower tension member, said members being integrally formed adjacent the ends thereof, a journal box integrally formed adjacent the merged portion of said members, said merged portion of said members extending over said journal box, said merged portion including the portion over said journal box being radially thickened adjacent the inner corner of said journal box, the thickened portion of said merged portion gradually tapering to the normal thickness of said tension member.

41. In a truck side frame, the combination of an upper compression member, a lower tension member, said members being integrally formed adjacent the ends thereof, a journal box integrally formed adjacent the merged portion of said members, said merged portion of said members extending over said journal box, said merged portion including the portion over said journal box being radially thickened adjacent one corner of said journal box, the thickened portion of said merged portion gradually tapering to the normal thickness of said compression member.

42. In a truck side frame, the combination of an upper compression member, a lower tension member, said members being integrally formed adjacent the ends thereof, a journal box integrally formed adjacent the merged portion of said members, said merged portion of said members extending over said journal box, said merged portion including the portion over said journal box being radially thickened adjacent the inner corner of said journal box, the thickened portion of said merged portion gradually tapering to the normal thickness of said compression member.

43. In a truck side frame, the combination of an upper compression member, a lower tension member, said members being integrally formed adjacent the ends thereof, a journal box integrally formed adjacent the merged portion of said members, said merged portion of said members extending over said journal box, said merged portion including the portion over said journal box being radially thickened adjacent the inner corner of said journal box, the thickened portion of said merged portion gradually tapering to the normal thickness of both of said members.

44. In a truck side frame, the combination of an upper compression member, a lower tension member, said members being integrally formed adjacent the ends thereof, a journal box integrally formed adjacent the merged portion of said members, said merged portion of said members extending over said journal box, said merged portion including the portion over said journal box being radially thickened adjacent one corner of said journal box, the thickened portion of said merged portion gradually tapering to the normal thickness of both of said members.

45. In a truck side frame, the combination of an upper compression member, a lower tension member, said member being integrally formed adjacent the ends thereof, a journal box integrally formed adjacent the merged portion of said members, said merged portion of said members extending over said journal box, said merged portion including the portion over said journal box being radially thickened adjacent one corner of said journal box, the thickened portion of said merged portion gradually tapering to the normal thickness of one of said members.

46. In a truck side frame, the combination of an upper compression member, a lower tension member, said members being integrally formed adjacent the ends thereof, a journal box integrally formed adjacent the merged portion of said members, said merged portion of said members extending over said journal box, said merged portion including the portion over said journal box being radially thickened adjacent the inner corner of said journal box, the thickened portion of said merged portion gradually tapering to the normal thickness of one of said members.

47. A truck side frame including spaced journal boxes, a side frame member connecting said journal boxes, said side frame member consisting of top and bottom chords and connecting side chords, said side frame member merging into a portion disposed above and integral with said journal boxes, said portion having side walls substantially coplanar with said side chords, said side walls being thicker than said side chords.

48. A truck side frame including spaced journal boxes, a side frame member connecting said journal boxes, said side frame member consisting of top and bottom chords and connecting side chords, said side frame member merging into a portion disposed above and integral with said journal boxes, said portion having side walls, said side walls being thicker than said side chords.

49. A truck side frame including spaced journal boxes, a side frame member connecting said journal boxes, said side frame member consisting of top and bottom chords and connecting side chords, one of said chords having portions extending over and substantially to the outer edge of said journal boxes, said portions being of varying thicknesses adjacent said journal boxes.

50. A truck side frame including spaced journal boxes, a side frame member connecting said journal boxes, said side frame member consisting of top and bottom chords and connecting side chords, said side chords merging into spaced chords extending substantially above said journal boxes, said spaced chords having portions thereof of varying thicknesses adjacent said journal boxes.

51. A truck side frame including spaced journal boxes, a side frame member connecting said journal boxes, said side frame member consisting of top and bottom chords and connecting side chords, the side chords having portions thereof of varying thicknesses adjacent said journal boxes.

52. A truck side frame including spaced journal boxes, a side frame member connecting said journal boxes, said side frame member consisting of top and bottom chords and connecting side chords, one of said chords having portions extending over and substantially to the outer edge of said journal boxes, said portions being of increased thicknesses adjacent said journal boxes.

53. A truck side frame including spaced journal boxes, a side frame member connecting said journal boxes, said side frame member consisting of top and bottom chords and connecting side chords, said side chords merging into spaced chords extending substantially above said journal boxes, said spaced chords having portions thereof of increased thicknesses adjacent said journal boxes.

54. A truck side frame including spaced journal boxes, a side frame member connecting said journal boxes, said side frame member consisting of top and bottom chords and connecting side chords, the side chords having portions thereof of increased thicknesses adjacent said journal boxes.

55. A truck side frame including spaced journal boxes, a side frame member connecting said journal boxes, said side frame member consisting of top and bottom chords and connecting side chords, one of said chords having portions thereof of increased thicknesses adjacent said journal boxes, and a reenforcing member extending from one corner of said journal boxes and along said frame member intermediate said top and bottom chords and substantially in the same direction thereof.

56. A truck side frame including spaced journal boxes, a side frame member connecting said journal boxes, said side frame member consisting of top and bottom chords and connecting side chords, said side frame member merging into a portion disposed above and integral with said journal boxes, said portion having side walls, said side walls and the side chords adjacent said side walls being of increased thickness radially from the inner extreme corner of said journal boxes.

57. A truck side frame including spaced journal boxes, a side frame member connecting said journal boxes, said side frame member consisting of top and bottom chords and connecting side chords, said side frame member merging into a portion disposed above and integral with said journal boxes, said portion having side walls, said side walls and the side chords adjacent said side walls being of increased thickness radially from one corner of said journal boxes.

Signed at Chicago, Illinois, this 22d day of October, 1931.

GEORGE G. FLOYD.